SWITCHING SYSTEM FOR TRANSVERSE SCANNING TAPE REPRODUCER

Filed Oct. 11, 1957 5 Sheets-Sheet 1

INVENTOR.
ERIC M. LEYTON
BY [signature]
ATTORNEY

April 11, 1961 E. M. LEYTON 2,979,562

SWITCHING SYSTEM FOR TRANSVERSE SCANNING TAPE REPRODUCER

Filed Oct. 11, 1957 5 Sheets-Sheet 2

INVENTOR.
ERIC M. LEYTON
BY [signature]
ATTORNEY

SWITCHING SYSTEM FOR TRANSVERSE SCANNING TAPE REPRODUCER

Filed Oct. 11, 1957 5 Sheets-Sheet 3

INVENTOR.
ERIC M. LEYTON

BY [signature]
ATTORNEY

SWITCHING SYSTEM FOR TRANSVERSE SCANNING TAPE REPRODUCER

INVENTOR.
ERIC M. LEYTON
BY [signature]
ATTORNEY

INVENTOR.
ERIC M. LEYTON
BY
ATTORNEY

United States Patent Office
2,979,562
Patented Apr. 11, 1961

2,979,562

SWITCHING SYSTEM FOR TRANSVERSE SCANNING TAPE REPRODUCER

Eric M. Leyton, Princeton, N.J., assignor to Radio Corporation of America, a corporation of Delaware Filed Oct. 11, 1957, Ser. No. 689,678
16 Claims. (Cl. 178—6.6)

The present invention relates to improvements in electrical switching systems and, more particularly, to a color television signal lateral scan type recording system switcher.

In the so-called "lateral scan" magnetic tape recording systems such as described in the De Forest Patent No. 2,743,318, information is recorded on tracks defined on the tape by a rotating head assembly which holds a plurality of magnetic transducers. These transducers are caused to scan the tape transversely (across its width) as the tape is moved in the direction of its length past the rotating head assembly.

In such a system, information to be recorded may be applied simultaneously to each of the transducers in the rotating head assembly. However, during playback of the recorded signal, to avoid excessive noise being present in the playback information signal, the output utilization circuit must be successively switched, gated, or commutated to connect to and receive information from a single transducer at a time. Further such switching must take place accurately and simultaneously between the several transducers. That is, as one transducer is switched "on," another transducer must be switched "off" simultaneously. Otherwise there is a discontinuity in the playback signal. Provision must be made to insure that a particular transducer is in actual scanning relation to the tape prior to its being switched on.

An additional problem arises when the information to be recorded is a television signal. In such case not only must the above switching requirements be met, but also the switching must occur during the blanking intervals so as not to interfere with the picture signal. When color television signals are employed, the switching problem becomes even more complex. FCC standard color television signals (see section 7.1 of the Television Engineering Handbook by Donald L. Fink, first edition, 1957, published by the McGraw-Hill Book Company), include a color reference burst signal which occurs during the blanking interval and immediately after each horizontal synchronizing pulse on what is termed the "back porch" of the horizontal deflection synchronizing pulse. In order to preserve the color reference burst, gating or switching between the transducers for successive tape scansions must occur in the interval after the horizontal pulse and prior to the color reference burst signal.

Accordingly, it is an object of this invention to provide an improved switching system for accurately switching sequentially between a plurality of inputs.

Another object of this invention is to provide an improved gating system for a lateral scan type tape recording system, in which a gating system insures that the output of a given transducer is in scanning relation to the tape prior to gating.

A further object of this invention is to provide an improved switching system for a lateral scan type tape recording system, which switching system performs the switching operation during the blanking interval of a recorded television signal.

Still another object of this invention is to provide an improved switching system for a color television tape recording system, which switching system provides accurate switching of a recovered color television signal at a time which occurs between the horizontal synchronizing pulse and prior to the color reference burst signal such that both the horizontal synchronizing information and the color reference information are obtained without distortion.

In accordance with a preferred embodiment of this invention, a color television signal recorded on transverse tracks on a magnetic tape is recovered by a rotating head assembly (holding four equally spaced magnetic transducers or heads) which sequentially scans the tracks containing the recorded color television signal. Each of the heads of the rotating head assembly is coupled to the input of a switcher, which sequentially passes the signal from a particular head as that head begins its tape scansion. The switcher provides automatic timing and synchronization with the rotating head assembly so that the switching transients occur during the horizontal retrace interval of the recorded television signal and yet prior to the recorded color reference signal without destroying the horizontal synchronizing pulse. The switcher receives rough switching pulses from a tone wheel rotated in synchronism with the rotating head assembly to signal as each head on the head assembly comes into scanning relation with the tape. The horizontal synchronizing information is separated from the recovered color television signal and is employed to change the state of a flip-flop circuit to thereby effectuate precisely the switching action.

A second pulse from the tone wheel is employed to indicate arbitrarily the beginning of each rotation of the rotating head assembly. This signal is employed to alternately switch between the first and third heads respectively and between the second and fourth heads respectively of the rotating head assembly. Accurate switching between the heads in each of these pairs is not required since the output signal is derived sequentially from the heads in order. The outputs from each of these switch pairs may then be coupled to a third switch, which, triggered by complementary outputs from a flip-flop, provides very accurate and precise switching with minimum loss of the recovered signal. A delay circuit is provided for rendering the switcher insensitive to noise pulses which may occur immediately after the receipt of each horizontal synchronizing pulse and thereafter for the duration of ½ of a horizontal television line.

The novel features of this invention, both as to its organization and method of operation, will best be understood from the following description, when read in connection with the accompanying drawings, in which like reference numerals refer to like parts, in which:

Figure 1 is a drawing, partly in perspective and partly in block diagrammatic form, of a magnetic tape recording and reproducing (playback) system particularly suitable for use for recording and reproducing color television signals;

Figure 2, which includes Figures 2*a* and 2*b*, is a perspective representation of a section of the magnetic tape of Figure 1 particularly illustrating the manner in which recording takes place thereon and the relative position of the control track with respect to the information tracks;

Figure 3 is a block diagram illustrating the details of the tone wheel employed in Figure 1;

Figure 1:
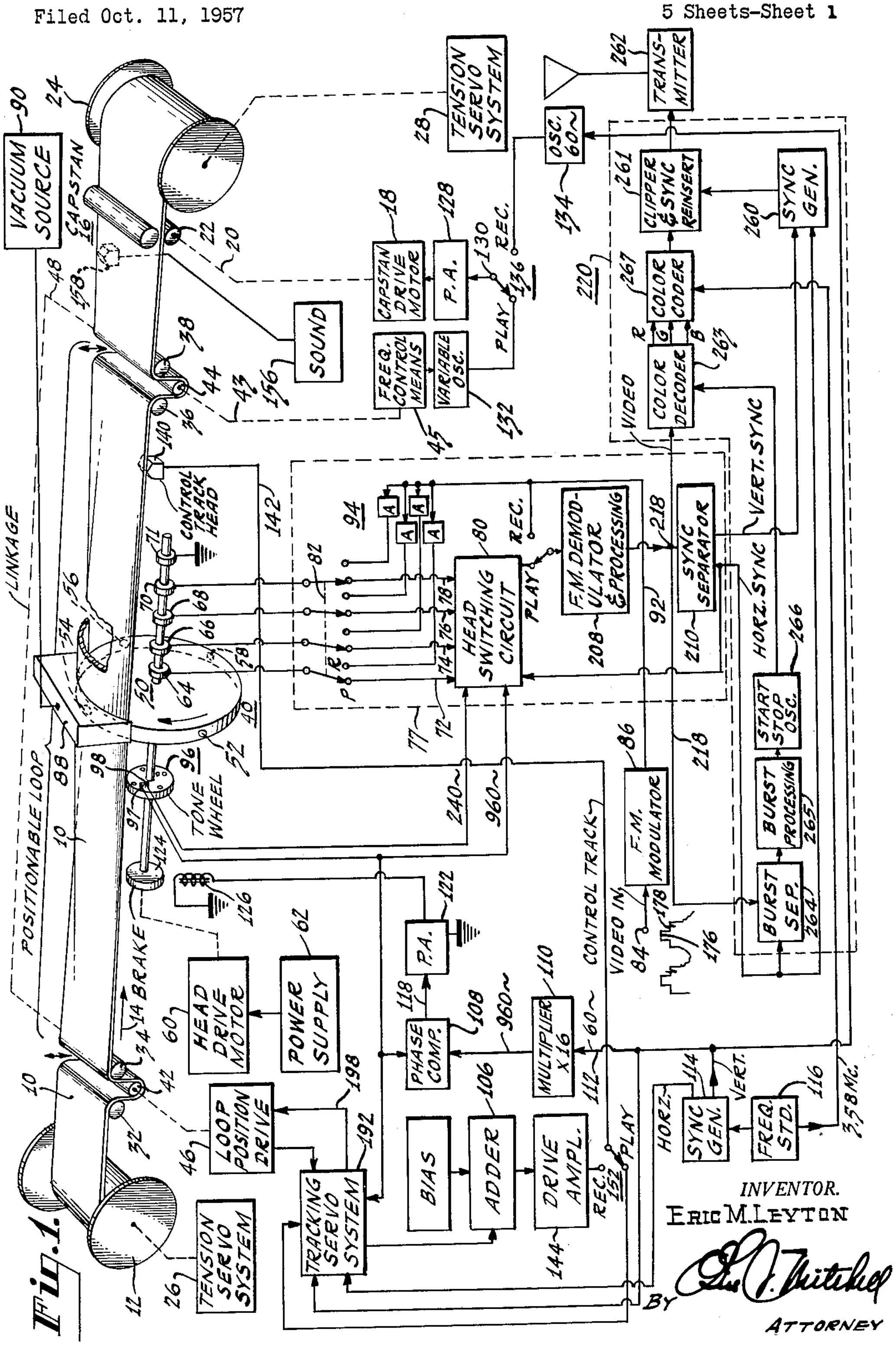

In the interest of clarity, all ground symbols have been omitted from the drawings. Thus it may be assumed that a ground return is associated with each of the blocks employed in the drawings where necessary.

The present invention will be described hereinafter by way of illustration as it is employed in a lateral scan magnetic tape recording system suitable for recording and reproducing color television signal information. As the description proceeds, however, it will become apparent that the novel features of the present invention are in no way limited to such use and may be employed for switching a variety of different types of signal intelligence.

GENERAL SYSTEM DESCRIPTION

Referring now to Figure 1, there is shown by way of example a lateral scan magnetic tape recording system suitable for recording color television signal information that uses a head switcher in accordance with the invention to switch between heads of the rotating head assembly. A movable recording medium 10 (magnetic tape) is played out from a tape supply reel 12 and pulled in the direction of the arrow 14. The pulling or moving of the tape 10 is accomplished by means of a capstan drive mechanism 16. The capstan drive mechanism 16 is driven by a capstan drive motor 18, the dotted line 20 indicating a suitable mechanical linkage between the capstant drive motor 18 and the capstan 22 of the capstan drive mechanism. Following the capstan drive mechanism and in the direction of tape motion, a tape take up reel 24 is provided. Both the tape supply reel 12 and the tape take up reel 24 are provided with a suitable tape tensioning device, in this instance a servo system. The drive motors and tension servo system for each of the tape reels 12 and 24 are shown in block diagram form at 26 and 28 respectively.

*Positionable tape loop*

As shown in Figure 1, the tape 10 in traveling from the tape supply reel 12 to the tape take up reel 24 is guided by fixed idler pulleys 32, 34, 36, and 38. The tape between the idlers 34 and 36 may be considered as a positionable loop which will be described in considerable detail in conjunction with Figure 6. Briefly, the positionable loop acts to rapidly move the position of the moving tape with respect to a given point (the rotating head assembly 40). Stated in another manner, the positionable loop may be thought of as instantaneously accelerating and decelerating the tape (or vice-versa) within the loop for a short time interval. This control is accomplished by a control signal acting through a tracking servo system 192 (described in conjunction with Figure 6). The control signal is of a character to maintain a proper position relationship between the tape 10 and a rotating head assembly 40. The acceleration and deceleration of tape 10 between the idlers 34 and 36 is accomplished by two movable idler pulleys 42 and 44 which are directly controlled by a loop position drive apparatus indicated in block form at 46. The details of this loop position drive apparatus are more fully described in conjunction with Figure 6. For the present, it may be stated that the loop position drive 46 coupled by a mechanical linkage indicated by the numeral 48, to the movable idler pulleys 42 and 44 operates these pulleys in a manner complementary to each other such as to control the relative tape position within the positionable loop.

By so coupling the movable pulleys 42 and 44, as the movable pulley 42 moves (upwardly in the drawing) to decrease the length of the tape loop extending between idlers 32 and 34, the idler pulley 44 is moved (downwardly in the drawing) to increase the length of tape between fixed idler pulleys 36 and 38. The reverse operation is also true. By this means, it can be seen that while the tape 10 is in motion the loop position drive apparatus operates to cause the tape 10 within the positionable loop to increase or decrease in velocity during the period in which the pulleys 42 and 44 are in motion. The tension on tape 10 remains constant throughout. A mechanical linkage 43 suitably coupled to the movable pulley 44 operates upon a frequency control means 45 to vary the frequency of an oscillator 132. The operation is such that as the movable pulley 44 varies from a preselected center position in an upward direction, under control of the loop position drive 46 and linkage 48, thus indicating the tape speed is too great the frequency control means 45 lowers the frequency of the oscillator 132 and thus the speed of the capstan drive 22 during playback. If the pulley 44 is moved in a downward direction, the tape speed is increased until the movable pulleys become centered. The frequency control means 45 may be any suitable arrangement for varying the frequency of the oscillator 132 and may, for example, be a variable resistor in a resistance capacitance type of oscillator 132. In this manner, the positionable loop makes rapid corrections of the position or velocity of the tape 10, which corrections are followed by a somewhat slower correction of tape speed until the positionable loop is centered.

*Transducing arrangement*

In the specific magnetic recording arrangement shown in Figure 1, information is recorded on and reproduced from the tape 10 by means of a rotating head assembly 40. The rotating head assembly 40 may take a variety of forms and in the illustration shown, is illustrated as a drum 50 having mounted on its periphery four magnetic transducers (heads) 52, 54, 56 and 58.

The drum 50 is driven by a head drive motor 60 which receives its driving power from a power supply 62. The electrical connections to the individual magnetic transducing heads are provided through an arrangement of slip rings 64, 66, 68, 70 and 71. The slip ring arrangement has been shown in simple diagrammatic form inasmuch as their particular physical arrangement and structural form is not important to the understanding of the present invention. It is sufficient to observe that by means of these slip rings, an electrical connection to each of the transducing heads is made available in cooperation with circuit ground at terminals 72, 74, 76 and 78 of a head switcher indicated by the dotted rectangle 77. Connections to the individual heads are also made available to the respective terminals of a four pole double throw switch 82.

The tape 10 is brought into physical contact with the rotating head assembly 40 by suitable means such as, for example, a vacuum shoe 88 and operated by an adjustable vacuum source 90. This arrangement is similar in principle to a tape contact control system shown in the U.S. Patent to C. N. Hickman, No. 2,648,589, issued August 11, 1953, titled "Magnetic Recorder."

In Figure 1, it is to be noted that all switcher and relay contacts shown in the diagram are indicated as being in their "reproduce" or "playback" (denoted as "play") position. The illustrated conditioning of the mechanism in Figure 1 as being that for playback will aid in later understanding the overall operation during playback. However, prior to considering the details of playback operation, it will be of assistance to consider in detail the recording process and the nature of the recording which the apparatus provides.

THE RECORDING OF A TELEVISION SIGNAL

*FM carrier recording*

A television signal to be recorded is applied to video input terminal 84 which in turn is coupled to the input of an FM modulator 86. The FM modulator 86 must be capable of frequency modulating a carrier with the video signal applied to terminal 84 and may be any suitable type. The exact frequency of the carrier will, of course, be chosen to depend upon the frequency response of the magnetic heads acting in combination with the speed of tape 10 and its magnetic characteristics. For purposes of convenience, it will be assumed that the carrier upon which the video signal information is frequency modulated is established at 5 megacycles. Present day magnetic tape characteristics and available head characteristics fully support the choice of a 5 mc. carrier for longitudinal tape speeds of 15 inches per second and a lateral tape scanning speed of 1500 inches per second.

The FM modulated carrier delivered by the FM modulator 86 is communicated over a circuit path 92 to the input of separate drive amplifiers 94 whose outputs are each in turn applied to one terminal (record) of double pole-double throw switches 82. During the recording of a television signal, the switch 82 is thrown to its record position R whereby the outputs of the drive amplifiers 94, respectively, are simultaneously applied to each of the magnetic transducing heads 52, 54, 56 and 58.

The head driving motor 60, tape reel drive and tension systems 26 and 28, and vacuum shoe 88, along with the capstan drive motor 18 being operative, the magnetic transducing heads 52, 54, 56, and 58 of the rotating head assembly 40 will cause a plurality of parallel magnetic tracks to be defined on the tape approximately transverse to the direction of tape motion. During the record process, the loop position drive apparatus 46 is locked so that the positionable loop described above is fixed relative to the rotating head assembly.

*Speed control of rotating head assembly during recording*

During recording, means are provided for sensing the rotational speed of the rotating head assembly, for comparing this speed with a local synchronizing signal, and for controlling the speed of the assembly 40 in accordance with the information derived from this comparison. The speed sensing means may comprise a tone wheel 96 taken in combination with magnetic pickups 97 and 98. The speed sensing means is described in detail in Figure 3.

Referring to Figure 3 the tone wheel 96 is seen to be a disc coupled to the same drive shaft as the rotating head assembly 40. The disc is of a magnetically susceptible material, having four equally spaced circular openings 61, 63, 65 and 67 formed on the periphery of one face thereof. These openings or intrusions are positioned at angular locations corresponding to the respective angular locations of the heads 52, 54, 56, and 58 on the rotating head assembly 40. This face of the disc also has a single circular opening or intrusion 69 angularly spaced to correspond to a point just behind the first head 52 (in terms of angular rotation). The pickups 97 and 98 respectively are positioned immediately adjacent the face of the disc and at the proper radial distance thereon to magnetically intercept the openings 61, 63, 65, and 67 and the single opening 69 respectively. The pickups 97 and 98 are each in the form of pole piece having as one pole a circular member having roughly the same diameter as each of the circular openings 61, 63, 65, 67 and 69. Pickup coils 99 and 100 are wound on the circular members of the pickups 97 and 98, respectively. The remaining pole of each pickup 97 and 98 is a cylindrical member mounted concentrically about the circular member and forming a continuous magnetic circuit with the circular member. Such pickups provide very sharp induced electrical pulses in the pickup coils 99 and 100 as the respective openings 61 to 69 cross the respective pickups. Thus pickup 97 provides a train of pulses each revolution of the head assembly and pickup 98 provides a single pulse with each revolution of the head assembly. It may be assumed that the speed at which it is desired to drive the rotating head assembly is nominally 14,400 r.p.m. so that if the tone wheel is provided with four openings or intrusions, the pulse train induced in the pickup coil 99 will have a nominal pulse repetition frequency of 960 cycles per second. The remaining pickup coil 100 provides a signal having a periodicity of one-quarter of the nominal 960 cycle rate; that is, 240 cycles per second.

These two component outputs from the pickups 97 and 98 are applied separately to a head switching circuit 80 in accordance with the invention, included in the head switcher 77, which is useful only during playback. The head switcher 77 will be described in conjunction with Figure 4. The 960 cycle component is also coupled to the tracking servo 192 and to a phase comparator circuit 108. In the phase comparator circuit 108, the 960 cycle component of the signal developed in the pickup coil 97 is compared in phase with the output of a multiplier 110. The multiplier 110 delivers a standard 960 cycle signal to the frequency comparator 108 which represents the multiplication (by a factor of 16) of a standard 60 cycle vertical synchronizing signal applied to the input terminal 112 of the multiplier. The 60 cycle standard signal may be derived from a standard synchronizing signal (sync) generator 114 which in turn is controlled by a 3.58 mc. frequency standard 116 delivering a signal conforming in frequency and stability to the requirements for a standard color subcarrier signal.

The phase comparator 108 delivers at the output terminal 118 thereof a type of servo control signal whose magnitude depends upon the amount the phase or frequency of the 960 cycle signal generated by the tone wheel 96 exceeds that from the sync generator 114. The servo signal passes to the input of the power amplifier 122. The speed control means may comprise an electromagnetic brake including a drum 124 and actuating coil 126. The brake may, for example, be electromechanical or purely magnetic in action. By choosing a head drive motor 60 having a capacity for driving the rotating head assembly 40 at a speed considerably above the nominal 14,400 r.p.m., the amplified control signal delivered by the power amplifier 122 to the actuating coil 126 effectively maintains the rotational speed of the head assembly 40 at the desired value.

*Capstan drive during recording*

The capstan drive motor 18, as shown in the drawing, is driven by the output of a power amplifier 128 whose input circuit terminal 130 is switched alternately between the signal outputs of two oscillators shown at 132 and 134. A switch 136 having a play and record position may be used for this purpose. During the recording of a television signal, the armature of the switch 136 is positioned so as to connect the output signal of the oscillator 134 to the input of the power amplifier 128. Oscillator 134 is in turn synchronized by the vertical drive pulses from the sync generator 114. There is thus a fixed timing relation between the speed of the capstan drive motor 18 and the speed of the head drive motor 60 during recording. During playback, with the playback switches in the play position, the variable oscillator 132 provides the capstan drive motor 18 with the required frequency signal. As described above, the speed of the capstan is varied to maintain the positionable loop centered.

*The position control track*

During recording, an additional track, a longitudinal track, is placed on the tape 10 which may be referred to as the position control track. Preferably, this track is defined along one edge of the tape medium. In the arrangement of Figure 1, a fixed magnetic transducing head 140 is provided within the positionable loop between the stationary idler pulleys 34 and 36. The transducer 140 may be referred to as the control track head. During the recording process, the control track head 140 is supplied with signals via circuit path 142 and switch 152 from a drive amplifier 144. The drive amplifier 144 is driven with a composite signal delivered by the adder 106 as is shown and described in Figure 6. The adder 106 provides the necessary A.C. bias currents for recording on tape. The control track therefore contains the 960 cycle signal from the tone wheel which is generated during record to signify the times during which head-switching may occur as is described below.

*Sound signal recording*

The accompanying sound signal to the recorded television signal is applied to the input terminal of a magnetic sound recording circuit 156. The sound recording circuit 156 may be conventional in character but terminating in a magnetic transducer 158 which operates upon another longitudinal track defined on the tape medium 10. This track will be referred to as the sound track and may be of the same character as well known magnetic sound recording tracks. Note that the sound transducer is located outside of the positionable loop so that acceleration and deceleration of the positionable loop will not impart undesirable variations in the reproduced sound signal.

*The character of the recorded magnetic tape pattern*

Figures 2A, 2B, 6:
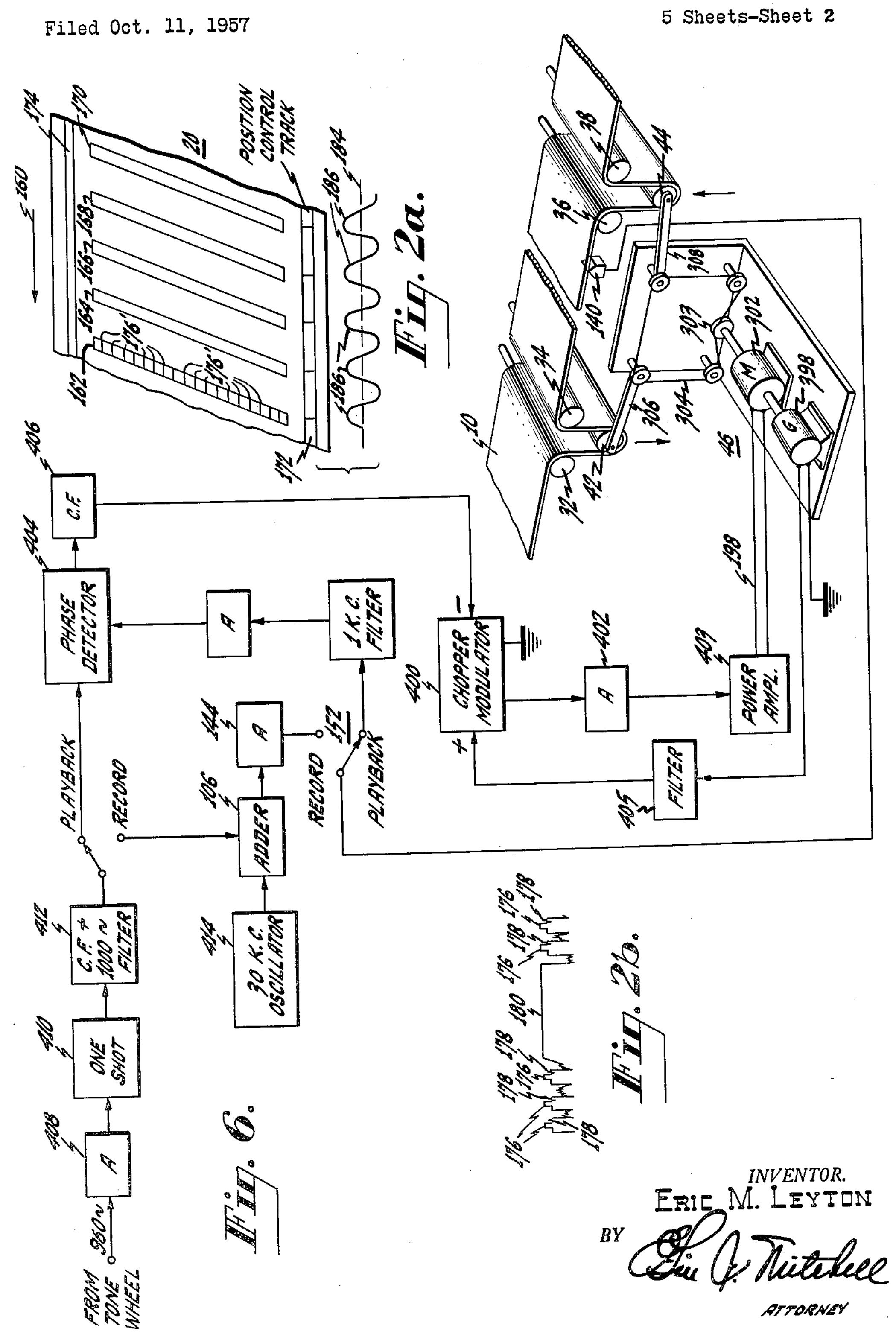
Figure 6 is a block diagram of the tracking servo system (Figure 1) wherein the positionable loop and the loop position drive 46 are illustrated in perspective.

To more clearly describe the system of Figure 1, attention will be directed to Figure 2*a* in which is illustrated an enlarged section of the magnetic tape 10. The showing in Figure 2*a* is not to scale and is not representative of the bare appearance of the tape after recording.

For this purpose in Figure 2*a*, the direction of tape travel will be assumed that indicated by the arrow 160. The transverse tracks defined by the magnetic transducing heads in the rotating head assembly 40 are indicated by the path delineations 162, 164, 166, 168 and 170. The position control track defined by the control track head 140 is represented by the path 172 while the sound track is indicated by the path 174. If, by way of example, the width of the magnetic tape 10 is assumed to be approximately 2 inches, the longitudinal tape transport motion approximately 15 inches per second, and the rotational speed of the rotating head assembly 40 at approximately 14,400 r.p.m., the distance between centers of the successive paths 162, 164, 166, 168 and 170 will be approximately 15.6 mils.

In Figure 2*b*, there is illustrated the conventional waveform of a composite color television signal. The standard horizontal line synchronizing pulses are indicated at 176. The color burst synchronizing component 178 occurs on the back porch of each horizontal pedestal following the horizontal line synchronizing component. The vertical synchronizing component is shown at 180. No attempt has been made to depict the standard equalizing pulse period and vertical sync serrations contained in a standard color television signal inasmuch as these aspects of the signal are of no particular importance in understanding the present invention.

In Figure 2*a*, the control track 172, recorded in a conventional manner, has been projected along a construction axis 184. The timing control signal is shown drawn about the axis. The 960 cycle component 186 is depicted with a cyclic reference point 186. Inasmuch as the control track head 140 (Figure 1) may be displaced from the rotating head assembly 40 by a substantial distance, it will be understood that the specific physical alignment illustrated in Figure 2*a* between the control track information and the position of the transverse track delineations is not required.

PLAYBACK OF RECORDED TELEVISION SIGNAL

During playback of the recorded television signal, it is generally desired to move the magnetic tape at the same rates of speed as occurred during recording. To accomplish this result a tracking servo system 192 (described in detail in Figure 6) operates through the positionable loop and frequency control means 45 to move the tape at rates of speed determined by the signals derived from the control track thus allowing the rotating head assembly 40 to track the transverse recording tracks 162–170 (Figure 2). After the tape has reached a nominal playback speed at least closely approximating the original recording speed (for example, 15 inches per second) the position of the tape 10 is adjusted with respect to the rotating head assembly so as to establish and maintain the tracking of he transducing elements in the rotating head assembly 40 with the transverse magnetic tracks (such as 162 through 170, Figure 2*a*) defined on the tape 10. Such action will be described as that of "tracking." For the present, the remainder of the system shown in Figure 1 will be described.

*Head switching circuit—general*

The head switcher 77 includes in accordance with the invention a head switching circuit 80, the FM demodulator and processing circuit 208, and the sync separator 210. The head switching circuit 80, which will be described more fully hereinafter in connection with the illustration in Figure 4 of the drawing, provides a commutating function which selects the signal output of the individual transducers 52, 54, 56 and 58 as is required to maintain a continuous video signal at the output of the FM demodulator and processing circuit 208. In order not to interrupt the playback video signal during a television line interval, means are provided within the head switching circuit 80 for switching from one transducer to another during a horizontal blanking interval and prior to the "back porch" thereof which portion is normally occupied by the color reference burst. Means are also provided within the head switching circuit for ensuring that the output of a given transducer in the head assembly is not commutated to the input of the FM demodulator 208 unless that particular transducer is in scanning relation to the magnetic tape. The FM demodulator and processing circuit 208 provides a continuous color television signal which may be applied to the input terminal 218 of a video signal utilization or processing circuit which is in the particular arrangement of Figure 1 indicated with the dotted line area 220.

COLOR VIDEO SIGNAL PROCESSING UNIT

The video signal processing unit 220 in effect removes the unwanted error modulation components from the color subcarrier and places the color information and higher components of the brightness information on a constant frequency color subcarrier from the frequency standard 116. The lower frequency video components are recombined with the color subcarrier. Sync signals from the sync circuit 210 and the FM demodulator 208 are then "cleaned up," for example, by a suitable sync generator 260 driven by the sync signals from the sync separator 210 to provide a composite sync signal, which is added to the reformed video color signal by a clipper (which removes the old sync) and sync reinserter circuit 261 which may be of conventional design. The now composite reprocessed composite color television signal is passed to a conventional transmitter 262 for broadcast. Such signal as broadcast will be stable and substantially independent of distortions produced during the recording and playback processes as noted above.

Referring now to Figure 1 the detailed construction and operation of the color processing unit 220 are described in accordance with the one form of the invention which employs a start-stop oscillator. In Figure 1 the playback video signal from the FM demodulator 208 is applied to a color decoder 263 and a burst separator 264. The burst separator 264 gated by the horizontal sync pulses from the sync separator 210 gates the color burst signal occurring at the beginning of each horizontal line, and passes this burst through a burst processing circuit 265. The positive and negative portions of the color reference burst signal are each clipped and amplified so that a stable color reference signal is obtained substantially free of swtiching transients and other noise information which may be present. The color burst, so processed, is now applied to the input of start-stop oscillator 266, a suitable circuit for which will be described in conjunction with Figure 7.

The start-stop oscillator 266 generates a reference color subcarrier signal which is synchronized as to its phase with the phase of the regularly recurring color burst from the burst processing circuit 265. More specifically, the start-stop oscillator is a circuit capable of changing its phase substantially instantaneously during the burst interval to that of the color reference burst present in the played back video signal at the beginning of each horizontal line of television information. The output of the start-stop oscillator 266 provides the reference signal for the color subcarrier, stable for the duration of one horizontal line for the color decoder 263 which may include a suitable decoder circuit for decoding the video signal from the FM demodulator 208 into its component color signals. In this manner, even though there be an abrupt change in phase due to misplacement the transducers in the rotating head assembly 40 or other variations due to the mechanical nature of the system, the reference subcarrier available for demodulating the playback signal will be correct both as to phase at the beginning of each horizontal television line. The system is sufficiently stable such that any distortions or other variations occurring during the interval of one horizontal television line are relatively insignificant and produce little noticeable distortions in the decoded video signal.

The color signals from the color decoder 263 may be representative of the red, green, or blue color separation images or alternatively may be the Y, I, and Q color signals, or other suitable demodulation components as desired. These decoded signals are reencoded by a suitable color coder 267 to which the stable color subcarrier from the frequency standard 116 is applied. Thus the encoded video information from the output of the color coder 267 to which a cleaned up sync is added by the clipper and sync reinserter 261 provide a relatively stable television signal which is independent of variations produced by the mechanical vagrancies of the recording and playback system, and which home receivers have little difficulty in following.

*Head switcher*

Figures 4, 7:
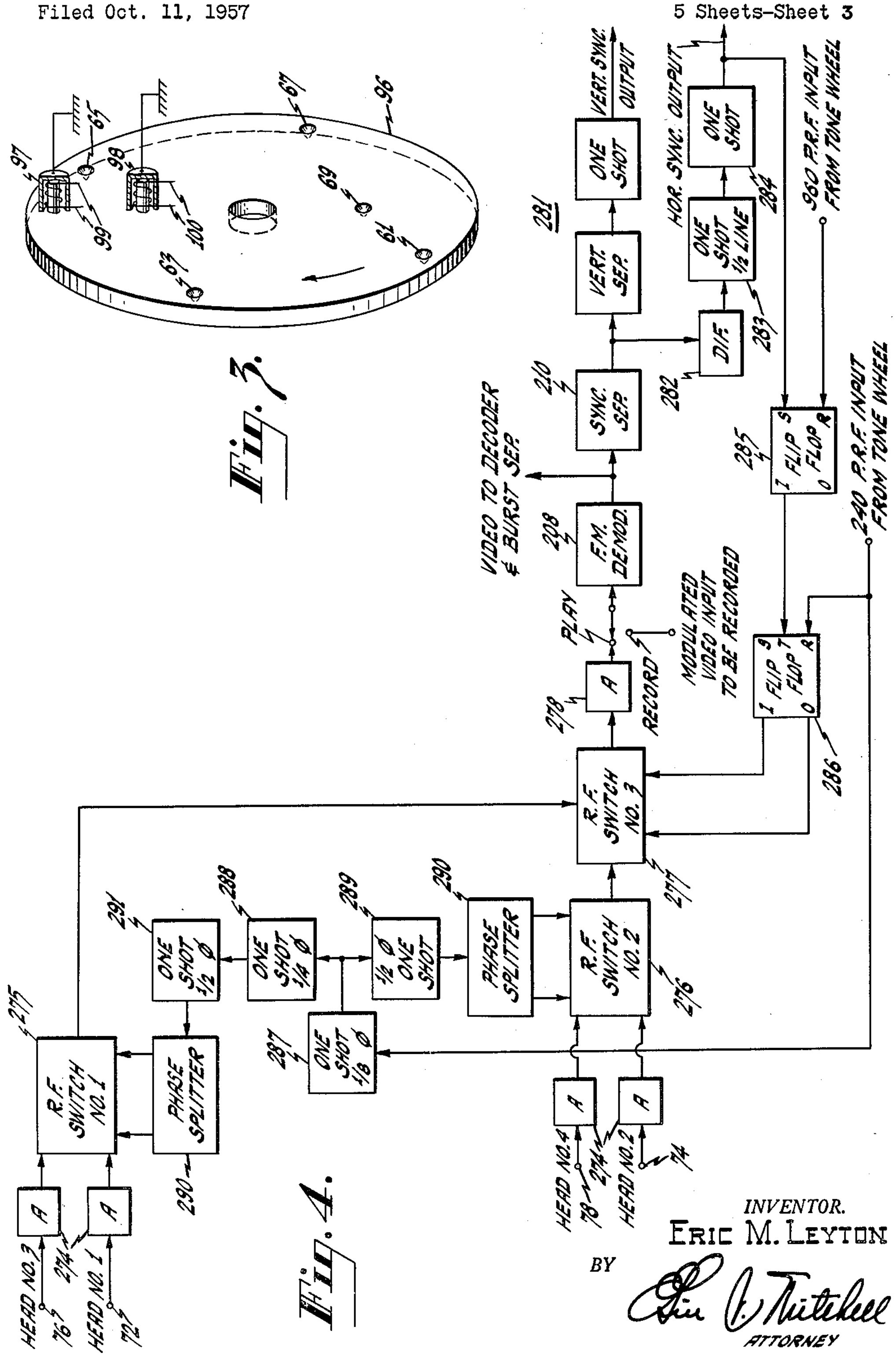
Figure 4 is a block diagram of the head switching system in accordance with this invention enclosed within the dotted area 77 of Figure 1.
Figure 7 is a schematic of a start-stop oscillator which may be employed in the decoding circuitry of Figure 1.

Referring now to Figure 4, the head switcher 77 and certain associated circuitry required to perform the head switching operation required in Figure 1 is illustrated by a block diagram. As noted above, the head switcher in accordance with this invention provides sequential switching between the outputs of the four transducers or heads 52, 54, 56 and 58 of the rotating assembly 40 of Figure 1. The coupling to each of the heads 52, 54, 56 and 58 is indicated by the descriptive labeling in Figure 4 as head numbers 1, 2, 3 and 4 respectively. This designation, applied to each of the pickup heads, is that corresponding to the relative arbitrary position of the head on the rotating head assembly; for example, head No. 1 may be considered as the head first to traverse the tape during a given cycle of rotation of the head assembly. Head numbers 2, 3, and 4 each traverse the tape in sequence.

To successfully transduce a recorded television signal in the system of Figure 1, the head switching circuit of Figure 4 must provide automatic timing and synchronization with the rotating head assembly, so that the switching transients occur during the horizontal retrace time of the recorded television signal. Moreover, there is the further requirement that the switching occur during the horizontal blanking, prior to the recorded color reference burst signal so as to not interfere therewith, and yet the switching must not destroy the recorded horizontal synchronizing pulse.

As will be described more fully hereinafter, the 960 cycle tone wheel signal delivered to the head switching circuit aids in "roughly" determining when the actual commutation or selective switching between the heads is to be accomplished. Horizontal synchronizing information delivered by the sync separator 210 (Figure 1) to the head switching circuit determines "precisely" when head switching action shall occur and establishes the same during horizontal blanking interval. The 240 cycle component of the tone wheel signal delivered to the head switching circuit serves to give the head switching circuit 80 an electrical sense of the relationship between a given head transducer and the tape 10. Since the rotating head assembly 40 is mechanically fixed relative to the tone wheel 96, the phase of the 240 cycle signal may be used as data pertaining to the mechanical position of the first head 52. Thus employed, the 240 cycle tone wheel insures that the output of each of the transducers is properly commutated or selected during tape scansion.

Each of the inputs 72, 74, 76 and 78 (Figure 1) from the four rotating pickup heads 52, 54, 56 and 58 (Figure 1) are coupled to a respective radio frequency amplifier 274. The ground return for each of the rotating pickup heads is indicated as a fifth slip ring in Figure 1. Thus the first and third pickup heads are coupled through respective RF amplifiers 274 to the input of a first radio frequency (RF) switch 275. In a similar manner, the pickup heads Nos. 2 and 4 are coupled through another pair of RF amplifiers 274 to the inputs of a second RF switch 276. The outputs of the first and second RF switches 275 and 276, respectively, are coupled to the inputs of a third RF switch 277. These RF switches may be any suitable switch capable of passing or blocking a radio frequency signal under the control of a switching or gating pulse. One suitable switch may be, for example, a triode type switch as disclosed in U.S. Patent 2,632,046 to Goldberg. Other suitable switches, such as the well-known diode switch, may be employed as desired.

The output of the third RF switch 277 is coupled through an amplifier 278 to the FM demodulator 208, in which the frequency modulated signal from the tape is demodulated. The output of the FM demodulator 208, which is now essentially a composite color television video signal, is coupled to the decoder, burst separator and processing system 220 of Figure 1 and to the sync separator 210. The output of the sync separator 210 is coupled through a vertical synchronizing signal processing circuit 281 and thence to the sync generator 260 of Figure 1. The horizontal sync pulse from the sync separator 210 passes through a differentiating circuit 282 to sharpen the leading edge of the horizontal pulse. The output of the differentiating circuit 282 triggers a first one-shot multivibrator 283 which provides a single output pulse, with the occurrence of the leading edge of each horizontal synchronizing pulse, having a time duration equal to more than one-half of a horizontal television line.

One-shot or monostable multivibrators are well known in the art and are described, for example, in the publication, "Radar Electronic Fundamentals, Navships Publications 900,016, published by the Navy Department." The one-shot multivibrator is a modification of the Eccles-Jordan circuit which accomplishes a complete cycle when triggered. One-shot multivibrators are usually employed to provide a given time delay, such that a succeeding circuit, which may be another one-shot multivibrator, is normally triggered by or is responsive to the trailing edge of the one-shot output pulse. The half line delay one-shot 283, however, is an exception to this general usage (for a reason set forth below), and its output is taken from the other side of the multivibrator than that normally employed, such that the second one-shot multivibrator 284 is triggered by the leading edge (instead of the trailing edge) of the first half line one-shot 283. In this manner, the one-shot multivibrator 284 provides an output horizontal synchronizing pulse, having the proper time duration, that is substantially coincident to that provided with the sync separator 210.

The horizontal synchronizing output pulse of the played back video signal is then, in effect, shaped or re-processed by the second one-shot multivibrator 284 and coupled to sync generator 260 of Figure 1. The horizontal sync output is also coupled to the set input "S" of a flip-flop 285.

A flip-flop (a form of the Eccles-Jordan circuit) is a circuit having two stable states, that is conditions, and two input terminals, one of which may be designated as reset, the other set. The flip-flop may assume the set condition by application of a high voltage (or pulse) on the set input terminal S or the reset condition by the application of a high voltage (or pulse) on a reset terminal R. Two outputs are associated with the flip-flop circuit which are given the Boolean tags of "one" and "zero." If the flip-flop is in its set condition (that is, set) the "one" output voltage is high and the zero output voltage is low. Unless otherwise indicated, the outputs from the flip-flop are taken from the "one" terminal. If the flip-flop is reset (that is, in its reset condition) the "one" terminal is low and the "zero" terminal is high. A flip-flop may also be provided with a trigger terminal T. Application of pulses to the trigger terminal T causes the flip-flop to assume the other condition from the one it was in when the pulse was applied.

The 960 cycle pulse repetition frequency gating signal from the tone wheel 96 (Figure 1) is coupled to the reset input "R" flip-flop 285. The set output (the one output) of the flip-flop 285 is coupled to the trigger input "T" of a second flip-flop 286. The "one" output of the second flip-flop 286 is coupled along with the "zero" output of the same flip-flop to the respective switching inputs of the third RF switch 277.

The 240 cycle input from the tone wheel 96 (Figure 1) is coupled to the reset input "R" of the second flip-flop 286 and to the input of a one-shot multivibrator 287 which provides a delay equal to one-eighth of the period of rotation ($\phi$) of the rotating head assembly 40 (and, of course, of the tone wheel 96). Stated in another manner, this delay is equavalent to 45° of rotation of the head wheel. The output of the one-shot multivibrator 287 is coupled to the input of a one-shot multivibrator 288 which provides a time delay equal to one-fourth of a revolution of the head assembly 40 and to the input of a one-shot multivibrator 289 which provides a time delay equal to one-half of the period of the rotating head assembly 40. Both multivibrators 288 and 289 are triggered by the trailing edge of the output signal of multivibrator 287. The output of the one-shot multivibrator 289 is coupled through a phase splitter 290 to the inputs of the second RF switch 276. The output of the one-shot multivibrator 288 is coupled through another one-shot multivibrator 291 having a time delay equal to one-half the period of the head assembly 40 and through a phase splitter 290 to the inputs of the first RF switch 275.

*Headswitcher operation*

Figure 5:
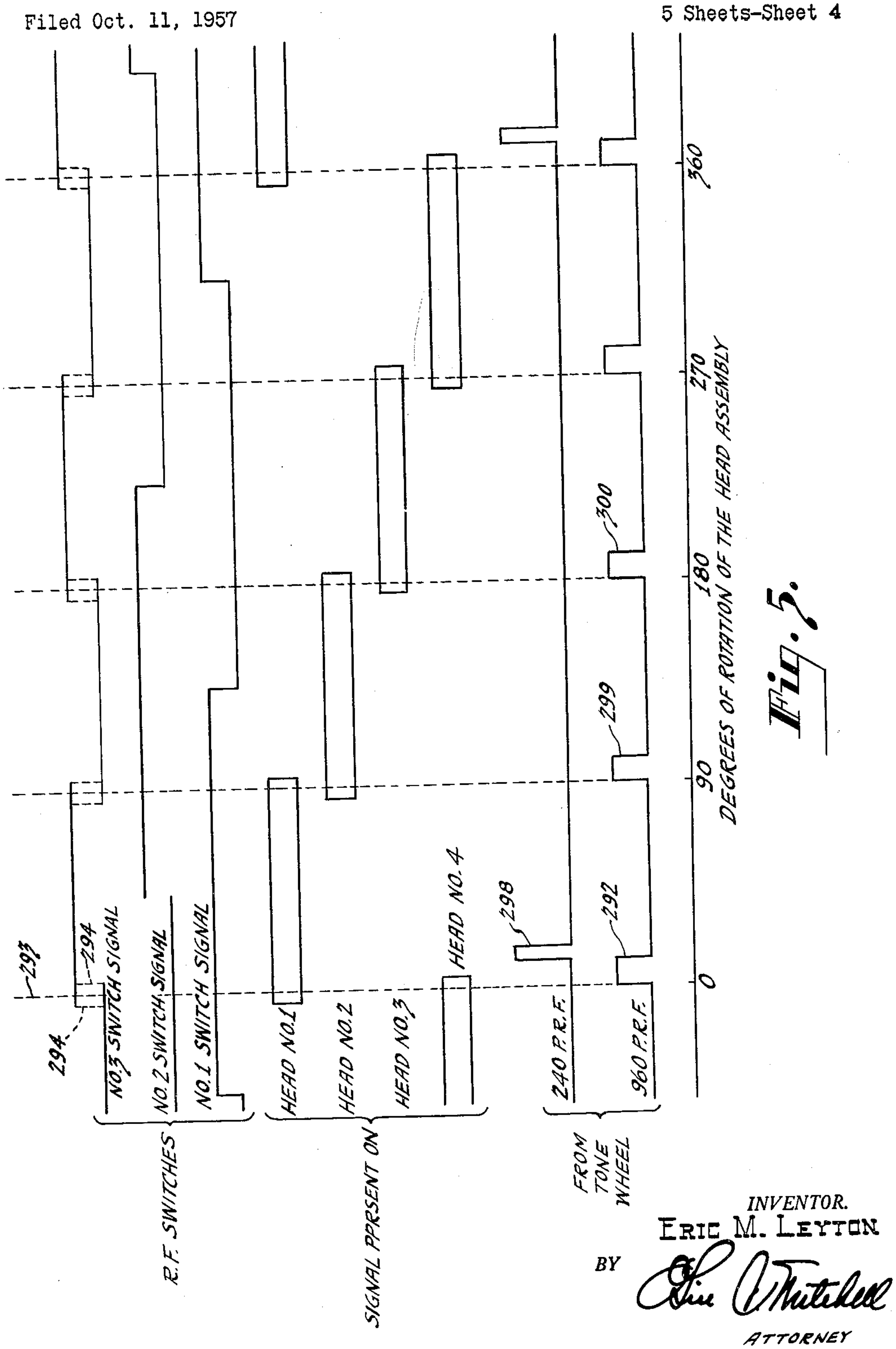
Figure 5 is a graph illustrating the relationship between the received signals from the several transducing heads and the switching signals employed with the system of Figure 4.
Figure 7:
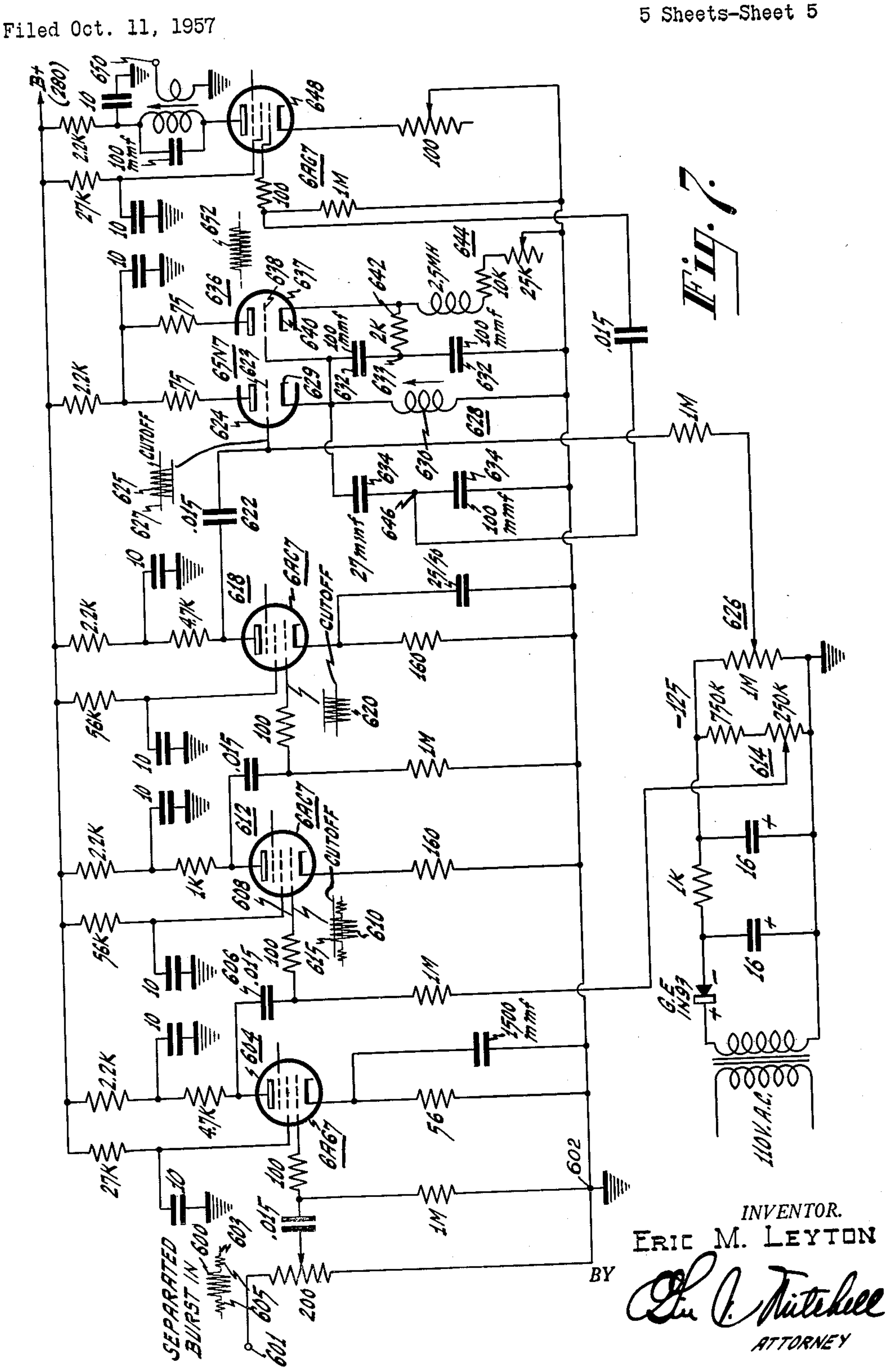

In describing the operation during playback, use will be made of the idealized waveforms, shown in Figure 5, of the several signals available to the head switcher plotted against rotational position of the head assembly. Thus, the signal available from head No. 1 is seen to occur before the beginning, or 0°, of the head assembly and to extend beyond the 90° point. During the beginning of this period, head No. 4 has available a signal for a time slightly beyond the 0° point of rotation. This overlap results, as noted previously, since the tape 10 has a width corresponding to slightly more than 90° of rotation of the head assembly. The pulses of the 960 cycle train available from the tone wheel 96 of Figure 1 occur at the 0°, 90°, 180° 270°, and points correspond- to location of the transducers 52, 54, 56 and 58 respectively. The second pulse train of 240 cycle pulses occur at times corresponding approximately to the location of head No. 1.

The 240 cycle pulse from the tone wheel 96 is delayed by one-eighth of a cycle of the tone wheel by the one-shot multivibrator 287 and utilized by the one-shot multivibrator 289 and phase splitter 290 to provide the switching signal for the second RF switch 276 (Figure 4). This switching signal, due to the action of the one-shot multivibrator 289, and phase splitter 290 provides an alternating pair of complementary switching signals for the second RF switch 276, which effects switching, thereafter, each 180° of rotation of the head assembly. The output of the one-eighth cycle delay one-shot multivibrator 287 is delayed an additional one-fourth revolution of the head assembly 96 (Figure 1) by the one-shot multivibrator 288. The second switching signal (Figure 4) is thus 90° out of phase with the first switching signal.

Thus, the signals from the first and third pickup heads are alternately switched by the first RF switch 275 during a time at which no signal is present from either of the heads. The signals from the second and fourth pickup heads are similarly switched by the second RF switch 276. Such system allows the use, if desired, of relatively slow-acting switches and a timing arrangement which need not be precise.

It now remains to alternately and accurately switch the outputs of the first and second RF switches 275 and 276, respectively, by the use of the third RF switch 277. The third RF switch 277 must be accurately timed, as noted above, in order that this final switching may occur during the television horizontal blanking interval, prior to the color reference burst signal, and in synchronism with the rotating head assembly 40. To accomplish such switching, the demodulated output from the third RF switch 277 is passed through the sync separator 210. The leading edges of the horizontal pulses obtained thereby trigger the one-shot multivibrator 283. The leading edge of the output of the one-shot multivibrator 283 triggers the one-shot multivibrator 284. The one-half line delay of the one-shot multivibrator 283 is employed to inhibit the response of the circuit to the double frequency horizontal pulses occurring during the vertical blanking interval and other spurious pulses occurring within this shortened time interval. The one-shot multivibrator 283 is in effect deactivated during the one-half cycle interval it provides an output pulse.

Assuming that the control flip-flop 285 has been reset by the first 960 cycle pulse 292 (Figure 5), the occurrence of a horizontal synchronizing pulse sets the first flip-flop 285 thereby triggering the switching flip-flop 286 which provides the necessary switching signals to the third RF switch 277. The time of this change is indicated by the dotted line 293 (Figure 5). It is seen that the area between the dotted lines 294 (the area of track overlap) of the third switching signal (Figure 5) is that during which switching can occur.

With the occurrence of a second 960 cycle tone wheel pulse 299, indicating that the second pickup head is now in the proper playback position, the first flip-flop 285 is reset. The next succeeding horizontal synchronizing pulse from the one-shot multivibrator 284 sets the flip-flop 285, thereby triggering the flip-flop 286 which opens the third RF switch 277 to pass the signal from the second head and the second RF switch 276 to the FM demodulator 208. The next tone wheel pulse 300 again resets the control flip-flop 285 after which the next horizontal synchronizing pulse derived through the presently open second head sets the control flip-flop 285, thereby triggering the switching flip-flop 286 and opening the third RF switch 277 to the signal now available from the third head through the first RF switch 275. Simultaneously the third RF switch 277 is closed to the signal from the second head. Thus, the cycle continues with the signal from each of the pickup heads being successively gated by the switcher of Figure 4 in synchronism with the horizontal synchronizing pulses.

If a horizontal pulse, or a pulse from a 960 cycle portion of the tone wheel is missed, or the control flip-flop 285 fails to change its state properly during the previously described head switching operation, the occurrence of the 240 cycle pulse 298 properly resets the switching flip-flop 286 at approximately the beginning of each cycle of rotation of the head assembly. If the switching flip-flop 286 is in the proper state, the occurrence of this pulse has no effect; otherwise, the switching flip-flop 286 is properly returned to the reset condition at the beginning of each cycle of rotation, such that with the occurrence of the pulse 299 (Figure 5) the operation of the head assembly 40 is again in synchronism with that of the head switcher of Figure 4.

By pairing down the inputs, two by two, from each of the pickup heads, the third RF switcher 277 is able, by operating from the complementary outputs of the switching flip-flop 286, to provide more accurate and precise switching. Furthermore, the circuit is made fail-safe by the application of 240 cycle pulse to the reset input of the switching flip-flop 286 at the beginning of each cycle to insure that the flip-flop is in the proper operating condition. By use of the leading edges of the separate horizontal synchronizing pulses, switching occurs during the horizontal retrace time without interfering with the color reference burst signal.

TRACKING SERVO

The tracking servo system illustrated in Figure 1, with certain of its associated circuitry, including relay 152, adder 106, amplifier 144, and loop position drive 46, is illustrated in Figure 6 by a block diagram and a partial perspective view of the positionable tape loop control.

During tracking, a servo information is derived from a precision comparison of the 960 cycle component of the tone wheel signal and the 960 cycle component from the control track signal . During tracking, the servo of Figure 6 obtains and maintains tracking of the lateral tracks 164 et seq. (Figure 2) by the rotating head assembly 40.

It is desirable that corresponding heads (52 to 58) be employed during playback and recording. The selection of the corresponding head during playback may be simply accomplished by manually pulsing the power amplifier 403 such as to cause the tape slip to another transverse track (162 to 170 in Figure 2). The pulsing is continued until by trial and error it is determined that the proper head is scanning the proper track.

During tracking the head drive motor 60 and rotating head assembly 40 are maintained at a speed by a servo control signal based upon comparison of the 960 cycle component of the tone wheel signal and the 960 cycle signal delivered by the multiplier 110 and derived from the sync generator 114. As previously described, this is accomplished by means of the phase comparator 108 which develops a servo signal which acts through the brake 124.

In the loop position drive 46 (Figure 1), the motor 302 (Figure 6) is coupled to a drive wheel 303 adapted to drive a movable belt 304. The belt 304, in turn, drives in opposite directions a pair of lever arms 306 and 308 respectively is coupled to the movable pulleys 42 and 308 respectively is coupled to the movable pulley 42 and 44 respectively, over which is stretched the tape web 10, which constitutes the positionable loop described previously.

In the particular embodiment of the servo system, illustrated herein, the servo system is adapted to control the relative position of the tape 10 within the positionable loop with respect to the rotating head assembly 40 (illustrated in Figure 1). If the motor 302 turns the drive wheel 303 in a clockwise direction, the pulley 44 is lowered, and the pulley 42 is raised. The net effect of the lowering of the pulley 44 and the raising of the pulley 42 is to position the tape web 10 to the right within the positionable loop. The converse is also true; if the drive wheel 303 is driven in a counterclockwise direction, the position of the tape 10 within the positionable loop is moved to the left relative to the control track head 140 during the time that the motor 302 is acting. Thus the motor 302, along with the drive belt 304, pulleys 42 and 44, and lever arms 306 and 308 provides a means of positioning the tape 10 substantially instantaneously within the positionable loop to allow the rotating head assembly to follow the transverse tracks as the tape is moved past the assembly. Of course, the positionable loop is maintained centered by the servo action on the capstan drive 22 as described previously.

The phase detector 404 operates during the playback operation of the tape recorder of Figure 1 and compares the 960 cycle tone wheel signal with the 960 cycles per second sine wave signal obtained from the control track of the tape 10. The control head 140 of Figure 1 is coupled through the relay 152 during the playback and through a one kilocycle filter and amplifier, to one input of the phase detector 404. The 960 cycle pulse from the tone wheel is coupled through an amplifier 408, a one-shot multivibrator 410 and a cathode follower and 1000 cycle filter 412, which convert the pulse to a sine wave, during playback to the second input of the phase detector 404. During record, the output of the cathode follower 412 is coupled along with a bias signal from a 30 kilocycle oscillator 414 to the resistance type adder 106. The output of the adder 106 is coupled through the amplifier 144 and the relay 152 to the control head 140.

The output of the phase detector 404 is coupled through a cathode follower 406 to one input of a chopper modulator 400. The output of the chopper modulator 400 is coupled through an amplifier 402 and power amplifier 403 to the motor 302. Directly coupled to the motor 302 is a generator 398. The generator 398 provides positive or negative output voltages depending on the direction of rotation thereof, which voltages are proportional to the velocity or speed of rotation of the generator. The polarity is such as to oppose the polarity of the voltage which, acting through the chopper 400 initiated rotation.

*Operation of the tracking servo system upon positionable loop*

As described previously in conjunction with Figure 1, when the tape system of Figure 1 is recording and the several playback-record relays are set in the record position, the pulses from the tone wheel occurring at a repetition rate of 960 cycles per second are shaped into sine waves and then combined in the adder 106 with a 30 kilocycle sine wave bias and recorded on the control track of the tape 10 by the control track head 140. Since relay 152 is connected to the record contact, the servo system of Figure 6 locks the position of the movable pulleys 42 and 44 so that the positionable loop remains fixed during record, i.e. the motor 302 remains fixed since it receives no actuation voltages.

During playback, the relay contacts are thrown to the playback position. The 960 cycle sine wave from the control track of the tape 10 is compared with the 960 cycle signal derived from the tone wheel 96 (Figure 1). More specifically, the 960 cycle pulse train generated by the tone wheel 96 (Figure 1) associated with the rotating head assembly is shaped by the one-shot multivibrator 410 and the cathode follower and filter 412. The resulting sine wave is applied to one input of the phase detector 404. The second input to the phase detector 404 is derived from the signal picked up by the control head 140.

The phase detector 404 generates a signal whose voltage level and polarity are a function respectively of the phase error between the two input signals and polarity or direction of such phase error. This error signal is coupled through the cathode follower 406 to one input of the chopper modulator 400. The chopper modulator 400, in turn, actuates and drives the two-phase servo motor 302 to effect further correction of the phase or speed of the tape strip 10 within the positionable loop.

If the phase of the 960 cycle signal derived from the control track is ahead of that derived from the tone wheel, the recorded track positions tend to lead the rotating head assembly. Thus the phase detector 404 generates a negative voltage which causes the motor 302 to rotate in a counterclockwise direction thereby adjusting the relative position of the tape 10 within the positionable loop to the left.

In order to modify this error drive voltage applied to the motor 302 to thereby effect a position feedback whereby the action of the tracking servo system may be modified and made more effective, the timing or velocity generator 398 provides a voltage which is proportional to the rotational speed of the servo motor 302. The polarity of this feedback voltage is as noted above such as to oppose the action of the servo motor 302. Thus in this case, the feedback voltage generated by the velocity generator 398 is positive in polarity and is applied through the filter 405 to the chopper modulator 400, thereby reducing in value the drive voltage applied to the motor 302. Once synchronism is again obtained between the 960 cycle pulse train from the control track and the 960 cycle from the tone wheel 96, the servo action ceases. All that remains in this instance wherein the position of the tape 10 within the positionable loop was moved to the left by the application of a negative voltage is for the frequency control means 45 acting through the oscillator 132 (Figure 1) to decrease the tape speed with which the tape 10 is moved by the capstan 22, thus allowing the positionable loop to recenter itself as previously described. As noted above, the polarity of the feedback voltage is such that it subtracts, when applied to the chopper modulator 400, arithmetically from the original error signal from the phase detector 404 which gave rise to the correcting voltage. Stated in another manner, the feedback to the chopper modulator 400, which is simply a two-contact chopper, is used with phase error information being applied to one contact and velocity feedback information applied to the other contact.

It is important to note that in connection with the tracking function performed by the tracking servo system 192, a 960 cycle signal was employed. Inasmuch as 960 cycles is the fourth harmonic of 240 cycles (the rate of rotation of the head assembly), it is apparent that it is possible to effectuate a tracking lock-in such that a given transducer, for example, transducer 58, on the rotating head assembly, does not fail to track during playback the particular lateral track it defined during recording. In practice, this is not a serious problem if the rotating head assembly and its transducers are made with sufficient precision. However, if desired, a given transducer may be made to scan a given track simply by causing the tracking servo system 192 to operate upon the 240 cycle signal information delivered by the tone wheel pickup coil 98. In this instance the 240 cycle signal would be recorded on the control track in place of the 960 cycle signal.

As pointed out previously, the 240 cycle signal from the tone wheel 96 may be used to identify the physical position of any one of the transducers with respect to the tape 10. The only disadvantage of employing the 240 cycle tone wheel signal for tracking tracking servo action is that the amount of error information per unit then delivered to the framing and tracking servo system 192 is reduced by one-fourth. The choice, therefore, between the use of 960 cycles or 240 cycles, or, in fact, other frequencies for use in accomplishing the tracking servo function, is mainly dependent upon the precision with which the rotating head assembly is made, the uniformity of the transducers therein, and the servo system response.

*Start-stop oscillator*

Figure 7 is a schematic of a circuit which is desirably employed for the burst processing and start-stop oscillator blocks 265 and 266 of Figure 1. The schematic of Figure 7 processes successive color reference bursts 600 from the recorded television signal and provides an output continuous reference signal having the same phase and frequency as each of the successive bursts 600. The color reference burst signal 600 is illustrated as several cycles at a frequency of 3.58 mcs., oscillating about an axis 603. Processing of the color reference signal 600 is required to eliminate any small gating or other transients 605 which may appear on either side of the color reference signal 600.

The color reference signal 600 is applied between an input terminal 601 and a reference potential such as ground 602 to the input of an amplifier 604. The amplifier 604 amplifies the color reference signal 600 to provide the signal 610. The amplified color reference signal 610 is coupled through a coupling capacitor 606 to the input 608 and a first clipper 612. The input 608 of the first clipper 612 is biased by a negative source of voltage 614 such that only the positive peaks 615 of the amplified color reference signal 610 allow conduction and amplification in the clipper 612.

The output of the first clipper 612 thus provides a negative-going signal 620 with the switching transients 605 and other noise information removed therefrom. The more negative portions of the negative wave form 620 are then clipped by a second clipper 618 to eliminate any noise or other spurious information, which have been originally attached to the peaks of the color reference burst 600. The second clipper 618 is biased to become cut off by the more negative peaks of the wave form 620. The output of the second clipper 618 is coupled through a second coupling capacitor 622 to the input 623 of a gate cathode follower 624. The input 623 of the gate follower 624 is coupled to a second source of negative potential 626 such that the gate cathode follower 624 is normally in an off or a non-conducting condition. This condition is illustrated by the wave form 625 (clipped at both the upper and lower amplitude extremities). The wave form 625 is represented by a positive-going wave form. Upon becoming more positive, the cutoff level 627 maintained by the negative bias 626, the gate cathode follower 624 is gated on.

The cathode follower 624 includes a cathode 629 having as a cathode load, the tank circuit 628 of a Colpitts-type oscillator 636. The oscillator 636 includes a vacuum tube 637 having a control electrode 638 and a cathode electrode 640. The tank circuit 628 includes an inductor 630 connected in parallel with first pair serially-connected capacitors 634 and a second pair of serially connected capacitors 632. The common point 633 between the second pair of capacitors 632 is coupled through a resistor 642 to the cathode 640 of the oscillator tube 637 and through a variable impedance 644 to ground. A second common point 646 between the first pair of capacitors 634 couples the output of the tank circuit 628 to the input of an output amplifier 648. The output of the output amplifier 648 is taken from an output terminal 650 with respect to ground 602.

The operation of the oscillator 636 is such that once its tank circuit 628 is excited to produce a sequence of oscillations, the feedback provided through the resistor 642 to the control electrode 638 of the oscillator tube 637 is of such a value that the oscillations in the tank circuit 628 are partially sustained. Such operation is attained by the proper adjustment of the variable impedance 644 to provide the necessary amount of feedback.

Thus, with the occurrence of each of the amplified and clipped color reference burst frequency signals 625, the cathode follower 624 is gated on. When conducting, the cathode follower 624 presents a very low impedance across the tank circuit 628 (the tank circuit normally has a very high Q). Oscillations in the tank circuit 628 are thus damped with each positive peak of each cycle of the color reference burst frequency signal above the cutoff level 627. Simultaneously, these positive peaks cause current to flow through the inductor 630 and the tank circuit 628 to thereby initiate a new set of oscillations having the same phase and frequency as that of the color reference burst signal 625. Thus, after a succession of positive peaks from the color reference burst frequency 625, the oscillator 636 is allowed to continue its oscillation until the occurrence of the next succeeding reference color burst signal.

Thus, the start-stop oscillator provides an output oscillation 652 having a variable time base; that is to say, the start-stop oscillator of Figure 7 provides an output oscillation 652 which is substantially instantaneously (during the burst interval) variable in its phase to have the same phase to that of each preceding color reference burst. It should be noted, however, that the schematic illustrated in Figure 7 is merely one of several oscillators which are capable of rapidly changing their phase in synchronism with a reference signal.

There has thus been described a very simple yet accurate switching system for successively commutating a plurality of inputs to a single output channel such that the information applied to the output channel is substantially continuous with little loss of information due to switching. Increased accuracy of the commutating or switching function is obtained by pairing down the input channels through switches two by two to a final output switcher. By operating this final output switcher from the complementary output of a switching flip-flop, very precise and accurate switching is obtained.

I claim:

1. Apparatus for switching successively between two sources of input signals, each said input signal including recurring signals, said apparatus operating in response to a source of switching signals, said apparatus comprising switching means coupled to each of said input signal sources, means coupled to the output of said switching means for deriving said recurring signals from said input signals, a bistable circuit having a first and a second stable operating condition, means including a first input of said bistable circuit coupled solely to said recurring signal deriving means for placing said bistable circuit in said first stable condition, means including a second input of said bistable circuit coupled solely to the source of said switching signal for placing said circuit in said second stable condition, means to couple the output of said bistable circuit to the inputs of said switching means.

2. A system for commutating input signals from four sources, each of said input signals including periodic gating signals, said commutating occurring in response to a first commutating signal having a frequency $f$, a second commutating signal having a frequency $f/4$, and in response to each of said input signals, said system comprising commutating means coupled to each of said input signal sources, means coupled to the output of said commutating means for deriving said periodic gating signals from said input signals, a first bistable circuit having a first and a second stable operating condition, means including a first input of said bistable circuit coupled solely to said gating signal deriving means for placing said circuit in said first stable condition, means including a second input of said bistable circuit coupled solely to a source of said first commutating signal for placing said circuit in said second stable condition, a second bistable circuit having a trigger input for alternately changing the operating state of the circuit from a first stable state to a second stable state coupled to the output of said first bistable circuit, means to couple the output of said second bistable circuit to the input of said commutating means, said second bistable circuit also having a reset input for placing said second bistable circuit into one of said stable operating conditions, means to connect said reset input to the source of said second commutating signal, whereby said second bistable circuit is placed in a predetermined stable state at least once during each four cycles of said first commutating signal.

3. A system for switching successively between two sources of input signals, each of said input signals including sequential gating signals, said switching system operating in response to a first switching signal and to each input signal, said switching system comprising switching means coupled to said input signal sources, means coupled to the output of said switching means for deriving said sequential gating signals from said input signals, a bistable circuit having a first and a second operating condition, means including a first input of said circuit coupled solely to said gating signal deriving means for placing said bistable circuit in said first stable condition, means including a second input of said circuit coupled solely to the source of said first switching signal for placing said circuit in said second stable condition, means to couple the output of said bistable circuit to the input of said switching means, and means coupled between said deriving means and said bistable circuit for preventing the operation of said bistable operation at a rate substantially greater than that of the rate of said gating signals.

4. In a lateral scan type tape recording system for recovering a composite television signal recorded on a magnetic tape, said television signal including horizontal deflection synchronizing pulses, said recovering system including two transducers adapted to alternately scan said tape and means for deriving a first switching signal as each of said transducers comes into scanning relation with said tape, apparatus for switching between said transducers to provide a substantially continuous recovered signal, said apparatus comprising switching means coupled to each of said transducers, means coupled to the output of said switching means for deriving said horizontal synchronizing pulses from said recovered composite television signal, and a bistable circuit having a first and a second stable operating condition, means including a first input of said circuit coupled solely to said pulse deriving means for placing said bistable circuit in said first stable condition, means including a second input of said circuit coupled solely to the source of said first switching signal for placing said circuit in said second stable condition, means to couple the output of said bistable circuit to the input of said switching means.

5. In a lateral scan type tape recording system for recovering a composite television signal recorded on a magnetic tape, said television signal including horizontal deflection synchronizing pulses, said recovering system including a plurality of transducers adapted to sequentially scan said tape and means for deriving a commutating signal as each of said transducers comes into scanning relation with said tape, apparatus for commutating between said transducers to provide a substantially uninterrupted recovered signal, said apparatus comprising commutating means coupled to each of said transducers, means coupled to the output of said commutating means for deriving said horizontal synchronizing pulses from said recovered composite television signal, and a bistable circuit having a first and a second stable operating condition, means including a first input of said circuit coupled solely to said pulse deriving means for placing said bistable in said first stable condition, means including a second input of said circuit coupled solely to said commutating signal deriving means for placing said circuit in said second stable condition, means to couple the output of said bistable circuit to the inputs of said commutating means.

6. A system for switching in sequence between a plurality of sources of input signals, each said input signal including periodic signals, said system including a source of a switching signal, switching means coupled to said input signal sources, means coupled to the output of said switching means for deriving said periodic signals from said input signals, a first bistable circuit having a first and a second stable operating condition, means including a first input of said bistable circuit coupled solely to said periodic signal deriving means for placing said circuit in said first stable condition, means including a second input of said circuit coupled solely to the source of said switching signal for placing said circuit in said second stable condition, a second bistable circuit having a trigger input coupled to the output of said first bistable circuit, said second bistable circuit being arranged to alternately change the stable condition thereof between a first and second stable condition in response to the output of said first bistable circuit, and means to couple the outputs of said second bistable circuit to the inputs of said switching means.

7. A system for commutating input signals appearing in time sequence from a plurality of sources, each of said input signals including periodic gating signals, said commutating occurring in response to a first commutating signal and to each of said input signals, said system comprising commutating means coupled to said input signal sources, means coupled to the output of said commutating means for deriving said periodic gating signals from said input signals, a first bistable circuit having a first and second stable operating condition, means including a first input of said bistable circuit coupled solely to said gating signal deriving means for placing said bistable circuit in said first condition, a source of a first commutating signal having a frequency corresponding to the rate at which said input signals appear from said plurality of sources, means including a second input of said bistable circuit coupled solely to said first commutating signal source, a second bistable circuit having a trigger input by which the operating condition of said second bistable circuit can be alternately changed between a first and second stable condition coupled to the output of said first bistable circuit, means to couple the output of said second bistable circuit to the input of said commutating means, whereby said input signals are randomly commutated after the occurrence of said first commutating signal upon the occurrence of the first one of said derived gating signals from said commutating means.

8. A system for commutating input signals from four sources, each of said input signals including periodic gating signals, said commutating occurring in response to a first commutating signal having a frequency $f$, a second commutating signal having a frequency $f/4$, and to each of said input signals, said system comprising commutating means coupled to said input signal sources, means coupled to the output of said commutating means for deriving said periodic gating signals from said input signals, a first bistable circuit having a first and a second stable operating condition, means including a first input of said bistable circuit coupled solely to said gating signal deriving means for placing said circuit in the first stable condition, means including a second input of said bistable circuit coupled solely to the source of said first commutating signal for placing said circuit in the second stable condition, a second bistable circuit having a trigger input for alternately changing the operating state thereof between a first and second stable condition coupled to the output of said bistable circuit, means to couple the output of said second bistable circuit to an input of said commutating means, said second bistable circuit also having a reset input for placing said second circuit in one of the stable conditions thereof, means to connect said reset input to the source of said second commutating signal, whereby said second bistable circuit is placed in a predetermined stable state at least once during each four cycles of said first commutating signal, means connected to the source of said second commutating signal and to the first and third of the input signal sources for alternately passing the input signals from the first and third input signal sources to said commutating means, and means connected to the source of said second commutating signal and to the second and fourth of the input signal sources for alternately passing the input signals from the second and fourth input signal sources to said commutating means.

9. A system for commutating input signals from four sources, each of said input signals including periodic gating signals, said commutating occurring in response to a first commutating signal having a frequency $f$, a second commutating signal having a frequency $f/4$, and to each of said input signals, said system comprising commutating means coupled to said input signal sources, means coupled to the output of said commutating means for deriving said periodic gating signals from said input signals, a first bistable circuit having a first and a second stable operating condition, means including a first input of said circuit coupled solely to said gating signal deriving means for placing said circuit in the first condition, means including a second input of said circuit coupled solely to the source of said first commutating signal for placing said circuit in the second condition, a second bistable circuit having a trigger input by which the operating state of said second circuit can be alternately changed between a first and second stable condition, means to connect said trigger input to the output of said first circuit, means to connect the output of said second circuit to an input of said commutating means, said second bistable circuit also having a reset input by which said second circuit can be placed in one of the stable conditions thereof, means to connect said reset input to the source of said second commutating signal, whereby said second circuit is placed in said one stable condition at least once during each four cycles of said first commutating signal, means connected to the source of said second commutating signal and to the first and second of the input signal sources for alternately passing the input signals from said first and second input signal sources to said commutating means, means connected to the source of said second commutating signal to shift the phase of said second commutating signal by ninety degrees, and means connected to said phase shifting means and to the third and fourth of the input signal sources for alternately passing the input signals from the third and fourth input signal sources to said commutating means.

10. In a lateral scan type tape recording system for recovering a composite television signal recorded on a magnetic tape, said television signal including horizontal deflection synchronizing pulses, said recovering system including four transducers and means for operating said transducers to sequentially scan said tape and means for deriving a first switching signal as each of said transducers comes into scanning relation with said tape, apparatus for switching between said transducers to provide a substantially continuous recovered signal, said apparatus comprising switching means coupled to each of said transducers, means coupled to the output of said switching means for deriving said horizontal synchronizing pulses from said recovered composite television signal, a bistable circuit having a first and a second stable operating condition, means including a first input of said circuit coupled solely to said pulse deriving means for placing said circuit in said first condition, means including a second input of said circuit coupled solely to said switching signal deriving means for placing said circuit in said second condition, a second bistable circuit having a trigger input by which the operating state of said second circuit is alternately changed between a first and a second stable condition, means to couple said trigger input to the output of said first circuit, and means to couple outputs of said second circuit to inputs of said switching means.

11. In a lateral scan type tape recording system for recovering a composite television signal recorded on a magnetic tape, said television signal including horizontal deflection synchronizing pulses, said recovering system including four transducers and means for operating said transducers to sequentially scan said tape and means for deriving a first commutating signal having a frequency $f$ for indicating when each of said transducers comes into scanning relation with said tape, means for deriving a second commutating signal having a frequency $f/4$ for indicating when a predetermined one of said transducers comes into scanning relation with said tape, apparatus for commutating signals recovered by said transducers to provide a substantially continuous recovered signal, said apparatus comprising commutating means coupled to each of said transducers, means coupled to the output of said commutating means for deriving said horizontal deflection synchronizing pulses from said recovered composite television signal, a first bistable circuit having a first and a second stable operating condition, means including a first input of said circuit coupled solely to said synchronizing pulse deriving means for placing said circuit in said first condition in response to the leading edge of each of said horizontal pulses, means including a second input of said circuit coupled solely to said first commutating signal deriving means for placing said circuit in said second condition, a second bistable circuit having a trigger input for alternately changing the operating state of said second circuit between first and second stable conditions, means to couple said trigger input to the output of said first circuit, means to couple the output of said second circuit to said commutating means, said second circuit also having a reset input for placing said second circuit into one of the stable conditions thereof, means to connect said reset input to said second commutating signal deriving means.

12. The system as claimed in claim 11 wherein said second commutating signal has a phase delayed with respect to the phase of the first commutating signal whereby to insure that said second bistable circuit assumes a predetermined stable state at a predetermined time.

13. In a lateral scan type tape recording system for recovering a composite television signal recorded on a magnetic tape, said television signal including horizontal deflection synchronizing pulses, said recovering system including four transducers and means for operating said transducers to sequentially scan said tape, means for deriving a first commutating signal having a frequency $f$ for indicating when each of said transducers comes into scanning relation with said tape, and means for deriving a second commutating signal having a frequency $f/4$ for indicating when a predetermined one of said transducers comes into scanning relation with said tape, apparatus for commutating between said transducers to provide a substantially continuous recovered signal, said apparatus comprising commutating means coupled to each of said transducers, means coupled to the output of said commutating means for deriving said horizontal deflection synchronizing pulses from said recovered composite television signal, a first bistable circuit having a first and a second stable operating condition, means including a first input of said circuit coupled solely to said synchronizing pulse driving means for placing said circuit in said first condition in response to the leading edge of each of said horizontal pulses, means including a second input of said circuit coupled solely to said first commutating signal deriving means for placing said circuit in said second condition, a second bistable circuit having a trigger input for alternately changing the operating state of said second circuit between first and second stable conditions, means to couple said trigger input to the output of said first circuit, means to couple the output of said second circuit to said commutating means, said second circuit also having a reset input for placing said second circuit into one of the stable conditions thereof, means to connect said reset input to said second commutating signal deriving means, means connected to said second commutating signal deriving means and to first and second of said transducers for alternately passing the recovered signals from said first and second transducers to said commutating means, means connected to said second commutating signal deriving means for shifting the phase of said second commutating signal by ninety degrees, and means connected to said phase shifting means and to the third and fourth of said transducers for alternately passing the recovered signals from said third and fourth transducers to said commutating means.

14. In a lateral scan type tape recording system for recovering a composite color television signal recorded on magnetic tape, said television signal including horizontal deflection synchronizing pulses and color reference burst signals, said recovering system including four transducers and means for operating said transducers to sequentially scan said tape, means for deriving a first commutating signal having a frequency $f$ for indicating when each of said transducers comes into scanning relation with said tape, and means for deriving a second commutating signal having a frequency $f/4$ for indicating when a predetermined one of said transducers comes into scanning relation with said tape, apparatus for commutating between said transducers to provide a substantially continuous recovered signal, said apparatus comprising commutating means coupled to each of said transducers, means coupled to the output of said commutating means for deriving said horizontal deflection synchronizing pulses from said recovered composite television signal, a first bistable circuit having a first and a second stable operating condition, means including a first input of said circuit coupled solely to said synchronizing pulse deriving means for placing said circuit in said first condition in response to the leading edge of each of said horizontal pulses, means including a second input of said circuit coupled solely to said first commutating signal deriving means for placing said circuit in said second condition, a second bistable circuit having a trigger input for alternately changing the operating state of said second circuit between first and second stable conditions, means to couple said trigger input to the output of said first circuit, means to couple the output of said second circuit to said commutating means, said second circuit also having a reset input for placing said second circuit into one of the stable conditions thereof, means to connect said reset input to said second commutating signal deriving means, means connected to said second commutating signal deriving means and to first and second of said transducers for alternately passing the recovered signals from said first and second transducers to said commutating means, means connected to said second commutating signal deriving means for shifting the phase of said second commutating signal by ninety degrees, and means connected to said phase shifting means and to the third and fourth of said transducers for alternately passing the recovered signals from said third and fourth transducers to said commutating means.

15. A system for commutating input signals appearing in timed sequence from a first, second, third and fourth source in that order, each of said input signals including periodic gating signals, said system comprising a source of a first switching signal having a frequency corresponding to the rate at which an input signal appears from one of said input signal sources, a first switching means coupled to the second and fourth of said input signal sources and to said first switching signal source for alternately passing the input signals from the second and fourth sources, means connected to said first switching signal source for shifting the phase of said first switching signal by ninety degrees, a second switching means coupled to the first and third of said input signal sources and to said phase shifting means for alternately passing the input signals from the first and third sources, a third switching means coupled to the output of said first and second switching means, means coupled to the output of said third switching means for deriving said periodic gating signals from said input signals passed by said third switching means, a bistable circuit, means to connect one input of said circuit to the output of said gating signal deriving means, a source of a second switching signal having a frequency corresponding to the rate at which the input signals appear from said input signal sources, means to connect a second input of said circuit to said second switching signal source, said circuit being arranged to assume one stable condition in response to each of said gating signals and to assume the other stable condition thereof in response to said second switching signal, a second bistable circuit having an input coupled to the output of said first circuit, said second circuit being arranged to alternately change the operating state thereof between first and second stable conditions in response to the output of said first circuit, said second circuit also having a second input coupled to said first switching signal source, said second circuit being arranged to assume one of the stable conditions thereof in response to said first switching signal, whereby said second circuit is placed in said one stable condition at least once for each four cycles of said second switching signal, means to apply a third switching signal from the output of said second circuit to said third switching means, said third switching means being responsive to said third switching signal to alternately complete an electrical path from said first switching means and said second switching means to said gating signal deriving means.

16. A system for commutating input signals appearing in timed sequence from a first, second, third and fourth source in that order, each of said input signals including periodic gating signals, said system comprising a source of a first switching signal having a frequency corresponding to the rate at which an input signal appears from one of said sources, a first switching means coupled to the second and fourth of said input signal sources, means coupled between said first switching signal source and said first switching means for operating said first switching means to pass alternately the input signals from said second and fourth sources, means connected to said first switching signal source for shifting the phase of said first switching signal by ninety degrees, a second switching means coupled to the first and third of said input signal sources, means coupled between said phase shifting means and said second switching means for operating said second switching means to pass alternately the input signals from said first and third sources, a third switching means coupled to the outputs of said first and second switching means, means coupled to the output of said third switching means of deriving said periodic gating signals from said input signals passed by said third switching means, a source of a second switching signal having a frequency corresponding to the rate at which said input signals appear from said input signal sources, means coupled to the output of said gating signal deriving means and to said second switching signal source for producing a third switching signal, means to apply said third switching signal from said third switching signal producing means to said third switching means, said third switching means being responsive to said third switching signal to pass alternately the signals from said first and second switching means to said gating signal deriving means.

References Cited in the file of this patent

UNITED STATES PATENTS

| | | |
|---|---|---|
| 2,817,701 | Johnson | Dec. 24, 1957 |
| 2,828,478 | Johnson | Mar. 25, 1958 |
| 2,836,650 | Johnson | May 27, 1958 |
| 2,876,295 | Irby | Mar. 3, 1959 |

OTHER REFERENCES

Rotary-Head Switching in the Ampex Video Tape Recorder, R. M. Dolby, Journal of the SMPTE, volume 66, April 1957, pp. 184–188.

UNITED STATES PATENT OFFICE
CERTIFICATE OF CORRECTION

Patent No. 2,979,562 April 11, 1961

Eric M. Leyton

It is hereby certified that error appears in the above numbered patent requiring correction and that the said Letters Patent should read as corrected below.

Column 24, under the heading "OTHER REFERENCES" add -- A System for Recording and Reproducing Television Signals, by Olson et al., RCA Review, March 1954, pages 3 to 17. --.

Signed and sealed this 3rd day of April 1962.

(SEAL)
Attest:

ERNEST W. SWIDER
Attesting Officer

DAVID L. LADD
Commissioner of Patents